United States Patent [19]

Marinus

[11] Patent Number: 5,469,349
[45] Date of Patent: Nov. 21, 1995

[54] POWER SUPPLY CIRCUIT AND CONTROL CIRCUIT FOR USE IN A POWER SUPPLY CIRCUIT

[75] Inventor: Antonius A. M. Marinus, Eindhoven, Netherlands

[73] Assignee: U.S. Philips Corporation, New York, N.Y.

[21] Appl. No.: 105,212

[22] Filed: Aug. 10, 1993

[30] Foreign Application Priority Data

Aug. 10, 1992 [NL] Netherlands .............................. 9201428

[51] Int. Cl.$^6$ .................................................. H02M 3/335
[52] U.S. Cl. .................................. 363/21; 363/97; 363/41
[58] Field of Search .................................. 363/21, 41, 56, 363/97

[56] References Cited

U.S. PATENT DOCUMENTS 4,791,544 12/1988 Gautherin et al. ..................... 363/21

FOREIGN PATENT DOCUMENTS 3444035 6/1986 Germany .

Primary Examiner—Peter S. Wong
Attorney, Agent, or Firm—Edward Blocker

[57] ABSTRACT

A power supply circuit for generating a stabilized power supply generally comprises a series arrangement of a primary winding of a transformer and a switch. The switch is controlled by a control circuit, an input of which receives a signal related to the output voltage of the power supply circuit. The control circuit determines the duty cycle of the switch. Dependent on the power consumption of the lead connected to the output of the power supply circuit, the duty cycle is either increased or decreased. The duty cycle has a given minimum value which is caused by the inertia of the switch upon switching on and switching off. The minimum duty cycle may be reached, inter alia, when the power supply circuit works in an apparatus using a standby mode. With reference to the power to be supplied to the lead and/or with reference to the duty cycle, the power supply circuit according to the invention determines the moment when the frequency of the control signal to be generated by the control circuit is switched to another fixed frequency.

13 Claims, 2 Drawing Sheets

POWER SUPPLY CIRCUIT AND CONTROL CIRCUIT FOR USE IN A POWER SUPPLY CIRCUIT

BACKGROUND OF THE INVENTION

The invention relates to a power supply circuit having input terminals for receiving an input voltage and output terminals for supplying an output voltage, which circuit comprises, coupled parallel to the input terminals of the power supply circuit, a series arrangement of a primary winding of a transformer and a switch, a secondary winding of the transformer coupled to the output terminals of the power supply circuit and a control circuit having an input which is coupled to the output terminals of the power supply circuit and an output for applying a control signal to the switch, said control circuit comprising an oscillator circuit for generating a pulse width-modulated control signal having a predetermined frequency.

The invention also relates to a control circuit for use in such a power supply circuit.

A power supply circuit of this type is known from German Patent Specification DE-C-3444035.

To ensure that an output voltage does not change independently of load variations, pulse width modulation (PWM), also referred to as duty cycle control, is generally used. A drawback of pulse width modulation (duty cycle control) is that the width of the pulse has a minimum. If the load decreases, the width of the pulse is reduced so as to keep the output voltage equal. Since the pulse is applied to a control electrode of, for example a transistor operating as a switch, it will take some time at the moment of the start of the pulse before the switch is rendered conducting. Moreover, at the end of the pulse it will take some time before the switch becomes non-conducting. At a given pulse width the switch will be conducting for a given minimum period of time and a further reduction of the pulse width does not have any influence on the conductivity time of the switch, until the width of the pulse becomes so narrow that the switch is not rendered conducting at all anymore.

Apparatuses such as television receivers, etc. in particular are in a standby mode for the greater part of the time. During this time only a small part of the apparatus is power supplied, inter alia, far example the reception section of the remote control unit. A general object is to ensure that the apparatuses in the standby mode consume a minimum quantity of energy. Due to this object, the width of the pulse in the standby mode becomes increasingly narrower when using pulse width modulation, so that the above-mentioned problems arise, or even get worse. Also in applications in which a (mains-supplied) apparatus requires a small quantity of power during a given part of the time (which need not be the above-mentioned standby mode) the above-mentioned problems occur. This problem is solved in the above-mentioned German Patent Specification by switching over from pulse width modulation to pulse packet control after the load has been detected to be below a given value. The pulse packet control implies that a plurality of pulses is successively applied at equal intervals and at a fixed width (wider than the minimum width) to the switch, whereafter no pulses are generated for a given period of time. The number of pulses is dependent on the load. A drawback of the known control is that the voltage generated by means of the switch and a conventional (primary winding of a) transformer (or wire-wound coil) should be extensively filtered to make the voltage suitable to be applied to a load, which filtering is necessary because the generated voltage has a large variation (ripple).

A further drawback of this known control is that audible transformer noise occurs. This is a vibration of the core (caused, inter alia by the air gap) and of the wires of the windings of the transformer, which vibration occurs in the transformer due to a low-frequency varying magnetic field.

SUMMARY OF THE INVENTION

It is, inter alia, an object of the invention to provide a power supply circuit and a control circuit which do riot have the above-mentioned drawbacks. To this end, a power supply circuit according to the invention is characterized in that the control circuit is adapted to receive a feedback signal at the input of the power to be supplied at the output terminals of the power supply circuit and is adapted to receive at a further input a signal to be externally set, said control circuit also comprising switching means for switching an oscillator of the oscillator circuit from the predetermined frequency to another fixed frequency in dependence upon the signal to be externally set and the feedback signal.

Switching the frequency when detecting that the load connected to the power supply circuit requires a power which is below the externally set value has the advantage that the duty cycle of the switch maintains such a value that this duty cycle remains above the minimum value. Moreover, due to the frequency switching, the power supply circuit operates more effectively because the losses in the different elements of the power supply circuit relatively become increasingly larger when the power required by the load is supplied, hence at a smaller duty cycle. By switching the frequency, the switch is switched on for longer periods of time in succession, but at a lower frequency.

The two frequencies of the oscillator circuit may differ, for example by a factor of two.

An embodiment of a power supply circuit according to the invention is characterized in that the control circuit comprises means for detecting the moment of switching to the other fixed frequency with reference to a current flowing through the switch during operation.

During operation a sawtooth-shaped current flows in the series arrangement of the primary winding of the transformer and the switch. The less power the load requires, the smaller the peak value of the current flowing through the switch. Consequently, this is a measure of determining the moment of switching the frequency.

A further embodiment of a power supply circuit according to the invention is characterized in that the means comprise a differential amplifier for amplifying the difference between the feedback signal and a reference signal, an output of the differential amplifier being coupled to the switching means.

Another embodiment of a power supply circuit according to the invention is characterized in that the control circuit comprises means for detecting the moment of switching to the other fixed frequency with reference to the given duty cycle, said means comprising an extra winding on the transformer, and a duty cycle detection circuit for detecting the duty cycle and for supplying a switching signal to the oscillator circuit.

The control circuit may be an integrated circuit and can also be used in other power supply circuits.

BRIEF DESCRIPTION OF THE DRAWINGS

These and other aspects of the invention will be apparent from and elucidated with reference to the embodiments described hereinafter. In the drawings

DESCRIPTION OF THE PREFERRED EMBODIMENTS

Figure 1:
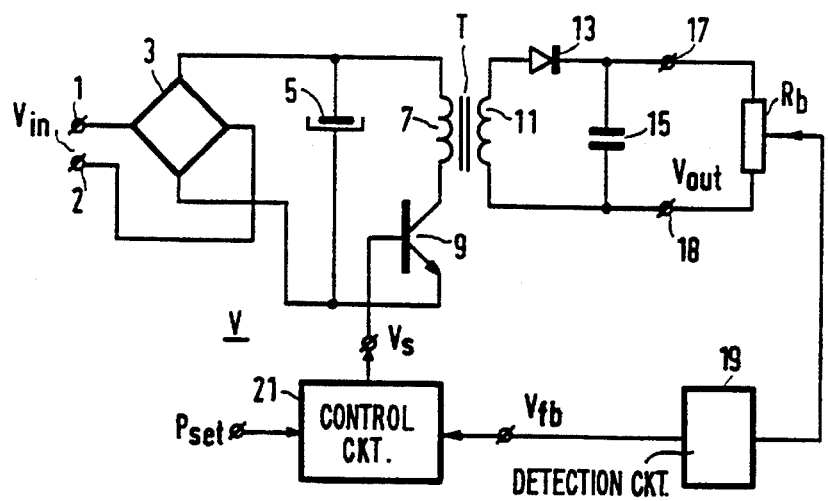
FIG. 1 is a general circuit diagram of a power supply circuit.

FIG. 1 shows a power supply circuit V which receives an input alternating voltage Vin (for example, the mains voltage) at input terminals 1 and 2. The input terminals are connected to a rectifier 3 for full-wave rectification of the input alternating voltage. A buffer capacitor 5 is connected across outputs of the rectifier. A series arrangement of a primary winding 7 of a transformer T and a transistor 9 operating as a switch is arranged parallel to this capacitor (in this embodiment the transistor is an NPN transistor, but a FET is alternatively possible; the choice of the type of transistor/switch is determined by specific design requirements and is known to those skilled in the art).

A secondary winding 11 of the transformer is connected to a series arrangement of a diode 13 and a capacitor 15. Output terminals 17 and 18 of the power supply circuit V supply an output voltage Vout across the capacitor 15. A load Rb (shown as a resistor) is connected across the output terminals. This load may be, for example all kinds of components of a display device, radio, CD player but also, for example a lamp.

The power supply circuit V further comprises a detection circuit 19 for detecting the energy to be supplied by the power supply circuit. The detection circuit supplies a signal Vfb to a control circuit 21 which, dependent on the load determined by the detection circuit (the power required), controls the period of conductance of the transistor 9. The detection circuit may comprise, for example a differential amplifier and an opto-coupler for maintaining a DC separation between the load (Rb) and the input side of the power supply circuit. The control circuit 21 also has a second input for receiving a predetermined minimum power Pset (the control circuit 21 will be further described with reference to FIGS. 2 and 3).

As stated above, such a power supply circuit is used, for example in a display device. The majority of present-day display devices uses a standby mode, in which mode the display device is switched off and can be switched on by means of, for example a remote control unit. During this standby mode the load is much lower than during normal use (during the standby mode, inter alia the display tube is not provided with the high voltage required for display). During the standby mode the control circuit 21 will therefore control the transistor (switch 9) with a much smaller duty cycle (a lower load requires less power).

When the load decreases, the width of the pulse is reduced so as to keep the output voltage equal. Since the pulse is applied to a control electrode of, for example a transistor operating as a switch, it will take some time at the moment when the pulse starts before the switch is rendered conducting (which is caused by the inertia of the transistor). At the end of the pulse it will also take some time before the switch becomes non-conducting. At a given pulse width the switch will be conducting for a given minimum period of time and a further reduction of the pulse width does not have any influence on the conductivity time of the switch, until the width of the pulse becomes so narrow that the switch does not become conducting at all anymore.

Apparatuses such as television receivers, etc. in particular are in a standby mode for the greater part of the time. During this time only a small part of the apparatus is power supplied, inter alia, for example the reception section of the remote control unit. A general object is to ensure that the apparatuses in the standby mode consume a minimum quantity of energy. Due to this object, the width of the pulse in the standby mode becomes increasingly narrower when using pulse width modulation, so that the above-mentioned problems arise, or even get worse.

A second problem which occurs when the load is derived (for example, during the standby mode) is that the power supply circuit becomes less effective at low loads. This implies that a relatively larger quantity of power is lost (is dissipated in the different elements of the power supply circuit) so that, relatively, an increasingly smaller quantity of power is available for the load.

Figure 2A:
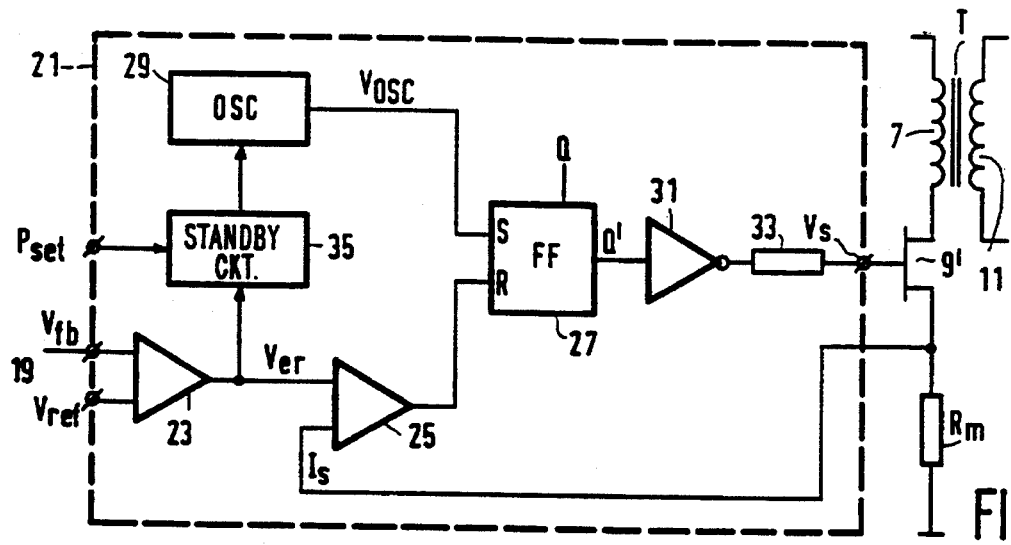
FIG. 2(a) shows a first embodiment of a control circuit for use in the power supply circuit according to the invention.

FIG. 2a shows a first embodiment of the control circuit 21.

The control circuit receives the signal Vfb from the detection circuit 19 and applies this signal to a first input of a differential amplifier 23. The differential amplifier receives a reference voltage Vref at a second input. This reference voltage is a voltage across the outputs 17, 18 (see FIG. 1) of the power supply circuit V (or a part thereof if Vfb via, for example a resistance division is also a part of the output voltage). The differential amplifier supplies the amplified difference as a voltage Ver at an output. The voltage Ver is applied to an input of a comparator 25. A second input of the comparator receives a signal Is which is a measure of the current flowing through the switch 9' (shown in this example as a FET) (measured across a measuring resistor Rm).

An output of the comparator 25 is connected to a reset input R of a flip-flop 27. The flip-flop receives a signal Vosc at a set input S, which signal originates from an oscillator circuit 29. FIG. 2c shows the different signals with respect to time. At instant t0 the signal Vosc has a (digital) high value. As a result, an output Q of the flip-flop 27 becomes digitally high, hence the output Q' (NOT-Q) becomes low. The output Q' of the flip-flop is connected to an inverting amplifier 31, which amplifier controls the switch 9' via an output resistor 33 having a voltage Vout. The current through the switch and through the measuring resistor Rm increases with a sawtooth shape. This results in a sawtooth-shaped signal Is at the second input of the comparator 25. The voltage Ver has a given DC value. At the instant (instant t1 in FIG. 2c) when the signal Is reaches this value, the value of the output of the comparator changes and supplies a reset signal (R, see FIG. 2c) to the flip-flop. Consequently, the output Q of the flip-flop becomes low and the output Q' becomes high so that the output signal Vout of the control circuit 21 becomes low. At instant t2 this cycle starts from the beginning again.

In this embodiment the control circuit also comprises a standby circuit 35 which receives the signal Ver at a first input. The standby circuit receives a signal Pset at a second input, which signal determines at which power consumption of the load the oscillator circuit 29 must switch. If the power consumption of the load decreases, the output signal Ver of the differential amplifier 23 also decreases. The standby circuit 35 determines with reference to the signal Ver (which is thus a measure of the power consumption) and with reference to the signal Pset when the frequency of the oscillator circuit 29 must be switched. The frequency of the oscillator is thus switched at a given minimum power (Pset). The power consumption is determined with reference to the signal Ver (which corresponds to a minimum peak current through the switch). At a decreasing power the frequency of the oscillator circuit is reduced so as to ensure that the switch (9, 9') is uninterruptedly on for a longer time (but at a lower repetition frequency) and to ensure that the power supply circuit is used more effectively. In FIG. 2c the graph for the current Is with Ver-stby shows the value of the output of the differential amplifier 23 at a low power consumption (for example during standby).

Figure 2B:
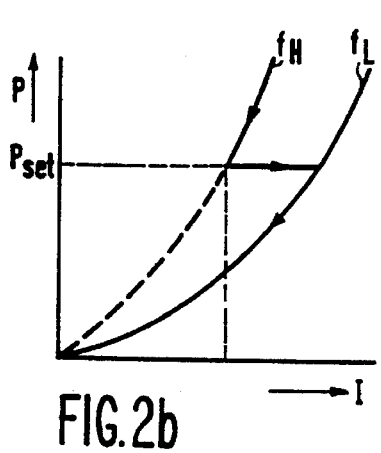
FIG. 2(b) is a graph of the power (P) vs. the current I of the power supply circuit.
Figure 2C:
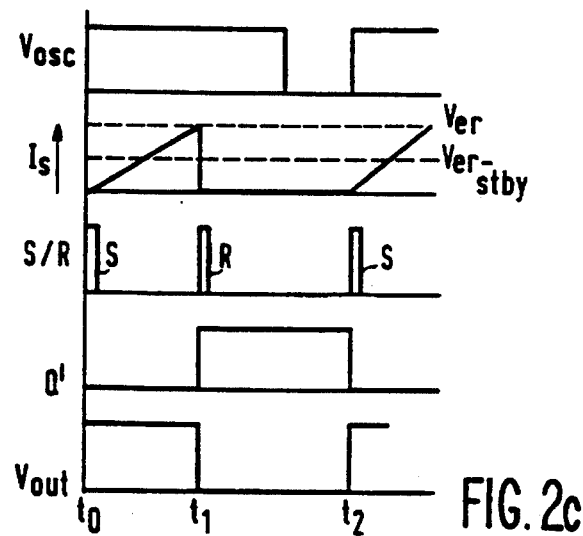
FIG. 2(c) is a graph of various signals of the power supply circuit and control circuit with respect to time.

In FIG. 2b the power P and the switching point Pset are plotted on the vertical axis and the current I is plotted horizontally, while Fh denotes the high frequency and F1 denotes the low frequency (for example Fh=2*F1). Arrows show the variation at a decreasing power consumption of the load. At an increasing power consumption the graph (FIG. 2b) is traversed in the opposite direction. The term standby circuit 35 raises the presumption that the apparatus in which this power supply circuit/control circuit is used has a standby mode. However, whether the apparatus has a standby mode is not important for the invention and for this power supply circuit.

Figure 3A:
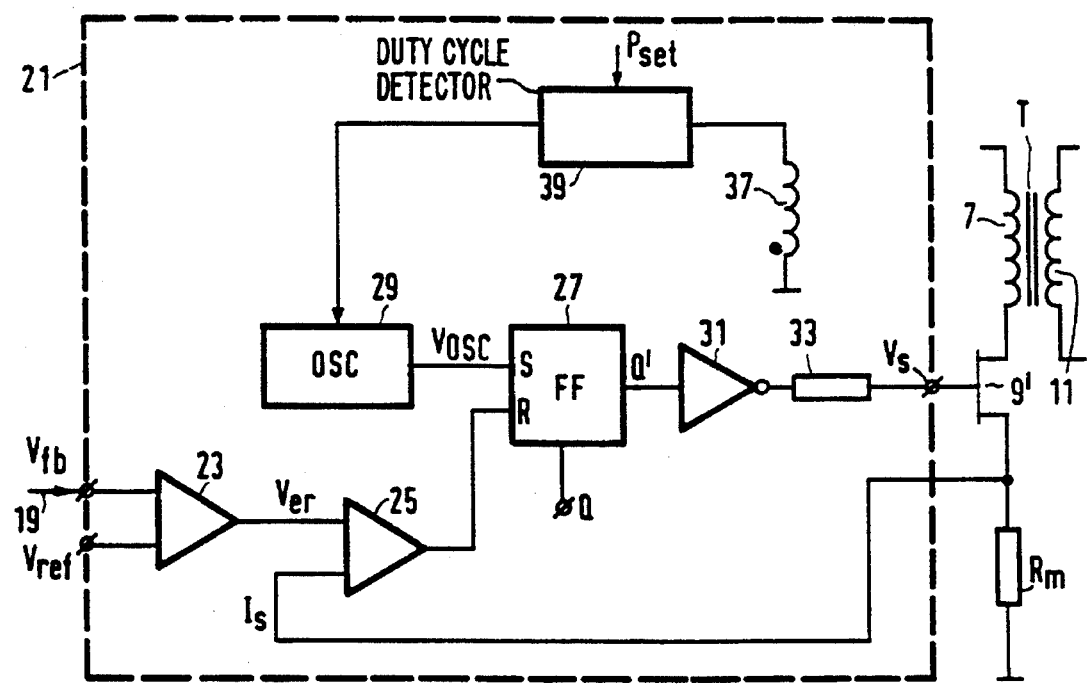
FIG. 3(a) shows a second embodiment of a control circuit for use in a power supply circuit according to the invention.

FIG. 3a shows a second embodiment of a control circuit 21 for use in a power supply circuit V (see FIG. 1). Elements having the same reference numerals as in FIGS. 1 and/or 2 operate in a similar way.

Also in this embodiment the control circuit receives the signal Vfb from the detection circuit 19 (see FIG. 1). The signal Vfb is applied to an input of the differential amplifier 23 which receives the reference signal Vref at a second input again. The differential amplifier again supplies the signal Ver to an input of the comparator 25. The comparator receives the signal Is again at a second input (which is measure of the current through the switch 9'). The output signal of the comparator again serves as a reset signal R for the flip-flop 27. The output signal Vosc of the oscillator circuit 29 again serves as a set signal S for the flip-flop. Now the flip-flop also supplies the signal Q' (NOT-Q) to the inverting amplifier 31 whose output again supplies the output signal Vout as a control signal to the switch via the output resistor 33.

Figure 3B:
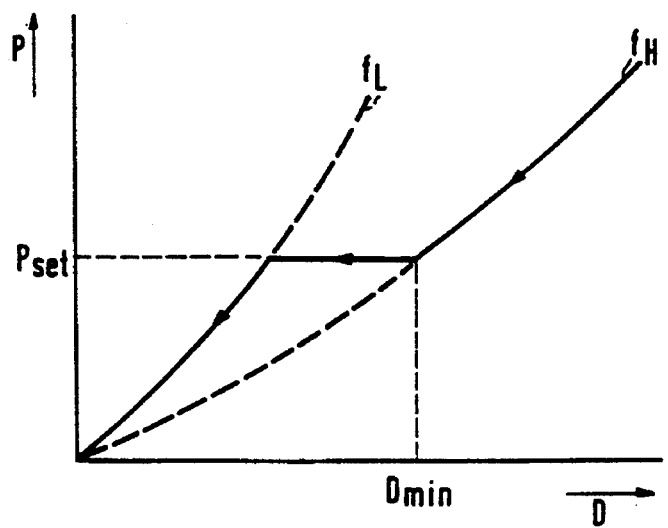
FIG. 3(b) is a graph of the power (P) vs. the duty cycle (D) of the power supply circuit.

In order to determine when the frequency of the oscillator of the oscillator circuit 29 must be switched, an extra winding 37 on the transformer T is used instead of the signal Ver. This extra winding is connected to a duty cycle detection circuit 39 for determining the duty cycle, of the switch 9' and for determining the switching moment of the oscillator circuit 29 with reference to the signal Pset. The duty cycle detection circuit determines the switching moment with reference to the duty cycle and the input signal Pset. This is shown diagrammatically in FIG. 3b. At a decreasing power (in the direction of the arrows) the duty cycle D reaches the value Dmin at a given moment, which value corresponds to a power consumption of Pset of the load. The duty cycle detection circuit 39 then supplies a signal to the oscillator circuit 29 whereupon the frequency of Fh is decreased to F1 (for example halved). In the case of an increasing power consumption of the load, the circuit of FIG. 3b is traversed in the opposite direction.

I claim:

1. A power supply circuit having input terminals for receiving an input voltage and output terminals for supplying an output voltage, comprising:

(a) a transformer having a primary and a secondary winding, (b) a power switch having main terminals and a control input, said power switch main terminals being connected in series arrangement with the primary winding of the transformer, said series arrangement being connected across the input terminals of the power supply circuit, (c) the transformer secondary winding being coupled to the output terminals of the power supply circuit, (d) a control circuit having a first input and a second input and an output coupled to the power switch control input and comprising an oscillator circuit, (e) said control circuit generating a pulse-width modulated control signal at a first frequency for controlling the output voltage of the power supply circuit, (f) first means responsive to a load connected to the power supply circuit output terminals for deriving a feedback signal and for coupling the feedback signal to the control circuit first input, (g) second means for supplying an external power set signal to the control circuit second input, (h) said control circuit further comprising switching means having an output connected to the oscillator circuit and having a first input for receiving a first signal related to the feedback signal and a second input for receiving the power set signal and in response to the first signal related to the feedback signal and to the power set signal for generating at its output a second signal which switches the frequency of the oscillator circuit when at the first frequency to a second frequency different from the first frequency and for generating at its output a third signal which switches the frequency of the oscillator circuit when at the second frequency to the first frequency, (i) said external power set signal determining the minimum load power consumption when the frequency of the oscillator circuit must switch from the first to the second frequency.

2. The power supply circuit of claim 1, wherein the oscillator circuit second frequency is lower than the first frequency, the feedback signal has a first value that represents a low value of the load current and a second value that represents a low value of the load current, and when the feedback signal has the first value the oscillator circuit is switched from its first to its second frequency and when the feedback signal has the second value the oscillator circuit is switched from its second to its first frequency.

3. The power supply circuit of claim 1, further comprising third means coupled to the power switch main terminals for detecting the instant of switching of the oscillator circuit from its first to its second frequency.

4. The power supply circuit of claim 1, wherein the control circuit further comprises a differential amplifier having an output connected to the switching means and a first input for receiving the feedback signal and a second input for receiving a reference signal and for generating at its output the first signal related to the feedback signal.

5. The power supply circuit of claim 1, wherein the control circuit further comprises third means for detecting the instant of switching of the oscillator circuit from its first to its second frequency.

6. A power supply circuit having input terminals for receiving an input voltage and output terminals for supplying an output voltage, comprising:

(a) a transformer having a primary and a secondary winding, (b) a power switch having main terminals and a control input, said power switch main terminals being connected in series arrangement with the primary winding of the transformer, said series arrangement being connected across the input terminals of the power supply circuit, (c) the transformer secondary winding being coupled to the output terminals of the power supply circuit, (d) a control circuit having a first input and a second input and an output coupled to the power switch control input and comprising an oscillator circuit, (e) said control circuit generating a pulse-width modulated control signal at a first frequency and with a given duty cycle for controlling the output voltage of the power supply circuit, (f) first means responsive to a load connected to the power supply circuit output terminals for deriving a feedback signal and for coupling the feedback signal to the control circuit first input, (g) second means for supplying an external power set signal to the control circuit second input, (h) said control circuit further comprising switching means having an output connected to the oscillator circuit and having a first input for receiving a first signal related to the feedback signal and a second input for receiving the power set signal and in response to the first signal related to the feedback signal and to the power set signal for generating at its output a second signal which switches the frequency of the oscillator circuit when at the first frequency to a second frequency different from the first frequency and for generating at its output a third signal which switches the frequency of the oscillator circuit when at the second frequency to the first frequency, (i) said control circuit further comprising third means for detecting the instant of switching of the oscillator circuit from its first to its second frequency with reference to the given duty cycle.

7. The power supply circuit of claim 6, wherein the third means comprises an extra winding on the transformer and a duty cycle detection circuit coupled to the extra winding for detecting the duty cycle of the power supply circuit and connected to the oscillator circuit for supplying to the oscillator circuit a switching signal when the duty cycle changes.

8. A control circuit for use in a power supply having a first input and a second input and an output coupled to a power switch control input, said control circuit comprising:

(a) an oscillator circuit, (b) said control circuit generating a pulse-width modulated control signal at a first frequency for controlling the output voltage of the power supply circuit, (c) said first input for receiving a feedback signal responsive to a load connected to the power supply circuit output terminals, (d) said second input for receiving an external power set signal, (e) said control circuit further comprising switching means having an output connected to the oscillator circuit and having a first input for receiving a first signal related to the feedback signal and a second input for receiving the power set signal and in response to the first signal related to the feedback signal and to the power set signal for generating at its output a second signal which switches the frequency of the oscillator circuit when at the first frequency to a second frequency different from the first frequency and for generating at its output a third signal which switches the frequency of the oscillator circuit when at the second frequency to the first frequency, (f) said external power set signal determining the minimum load power consumption when the frequency of the oscillator circuit must switch from the first to the second frequency.

9. The control circuit of claim 8, wherein the oscillator circuit second frequency is lower than the first frequency, the feedback signal has a first value that represents a low value of the load current and a second value that represents a low value of the load current, and when the feedback signal has the first value the oscillator circuit is switched from its first to its second frequency and when the feedback signal has the second value the oscillator circuit is switched from its second to its first frequency.

10. The control circuit of claim 8, further comprising first means for receiving a signal indicating the instant of switching of the oscillator circuit from its first to its second frequency.

11. The control circuit of claim 8, wherein the control circuit further comprises a differential amplifier having an output connected to the switching means and a first input for receiving the feedback signal and a second input for receiving a reference signal and for generating at its output the first signal related to the feedback signal.

12. The control circuit of claim 8, wherein said pulse width modulated control signal determines a given duty cycle, and the control circuit further comprises first means for detecting the instant of switching of the oscillator circuit from its first to its second frequency with respect to the given duty cycle.

13. The control circuit of claim 12, wherein the first means comprises an extra winding of a transformer and a duty cycle detection circuit coupled to the extra winding for detecting the duty cycle of the power supply circuit and connected to the oscillator circuit for supplying to the oscillator circuit a switching signal when the duty cycle changes.

* * * * *